Patented Dec. 26, 1944

2,366,007

UNITED STATES PATENT OFFICE 2,366,007

PRODUCTION OF SYNTHETIC POLYMERIC COMPOSITIONS COMPRISING SULPHONATED POLYMERIZATES OF POLY-VINYL ARYL COMPOUNDS AND TREATMENT OF LIQUID MEDIA THEREWITH

Gaetano F. D'Alelio, Pittsfield, Mass., assignor to General Electric Company, a corporation of New York No Drawing. Application August 11, 1942, Serial No. 454,434

17 Claims. (Cl. 210—24)

This invention relates to the production of synthetic polymeric compositions and to their use for the removal of cations from liquid media. The invention is concerned, more particularly, with compositions of matter comprising sulphonated, cross-linked, insoluble, infusible polymerizates of poly-vinyl aryl compounds and with their use in removing cations from liquid media, especially aqueous media.

Many natural and synthetic compositions have been proposed for removing ions from solutions. Such materials to be useful must possess the following properties:

1. They must contain either a chemical group which will react with the ion or have an activated surface which physically adsorbs the ion.
2. They must be capable of regeneration to at least part of their original activity so that they may be reused.
3. They must be insoluble in the liquid media before and after removing ions from the media. Thus, if an acid were used as the treating agent it would have to be insoluble both as the acid and as the salt since the acid is the form before adsorbing cations and the salt is the form after adsorbing cations.

Polymeric divinyl benzene and copolymers of divinyl benzene are known. However, these polymeric bodies are not capable of removing ions from liquid media. I have now discovered that these polymeric compounds, even though they are insoluble, may be sulphonated. Such sulphonated products are very effective in removing cations from liquid media and meet all three requirements set out above.

Any suitable method may be used in preparing the polymerizates of poly-vinyl aryl compounds which are sulphonated to produce the compounds of my invention. For example, a poly-vinyl aryl compound may be polymerized alone or with other polymerizable compounds in the presence or absence of a solvent or a dispersion medium for the monomer or monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulphate, sodium persulphate, sodium perchlorate, sodium perborate, potassium persulphate, etc.; ozone; ozonides; etc. Additional examples of polymerization catalysts that may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials. Partially polymerized divinyl aryl compounds may be made by polymerizing in the presence of both an accelerator and inhibitor of polymerization. Such methods are more fully described and specifically claimed in my copending applications Serial Nos. 448,155; 448,156; 448,157 and 448,158, filed June 23, 1942, and assigned to the same assignee as the present invention.

After polymerization is complete, the product is isolated, if a solvent or dispersion medium is used, and ground to a granular form. The product is sulphonated by the use of known sulphonating agents, e. g., concentrated sulphuric acid, fuming sulphuric acid, chlorosulphonic acid, etc.

Since the sulphonic acid group is the active cation-removing group in my novel polymerizates and since the sulphonic acid group can only easily be introduced into an aryl nucleus I prefer that the major proportion of the polymerizate which is to be sulphonated, be made from polymerizable components that contain an aryl nucleus. Thus, the polymerizate may be made by polymerizing a poly-vinyl aryl compound alone, copolymerizing a plurality of polyvinyl aryl compounds, copolymerizing at least one poly-vinyl aryl compound with at least one mono-vinyl aryl compound, copolymerizing a mixture of polymerizable compounds, the major proportion of the polymerizable compounds being either at least one poly-vinyl aryl compound or at least one poly-vinyl aryl compound and at least one mono-vinyl aryl compound.

Illustrative examples of suitable poly-vinyl aryl compounds which may be used are:

Divinyl benzenes
Divinyl toluenes
Divinyl naphthalenes
Divinyl xylenes
Divinyl ethyl benzenes
Divinyl chlorobenzenes
Divinyl-phenyl vinyl ethers Illustrative examples of suitable mono-vinyl aryl compounds which may be used are:

Styrene (vinyl benzene)
Vinyl toluenes
Vinyl naphthalenes
Vinyl ethyl benzenes
Alpha-methyl styrene
Vinyl chlorobenzenes
Vinyl xylenes When a liquid medium having various cation impurities dissolved therein is brought in contact with the sulphonated, insoluble, infusible polymerizates of my invention, the cations, e. g., sodium ions, calcium ions, lead ions, magnesium ions, iron ions, silver ions, etc., react with the sulphonic acid groups to form salts which are also insoluble and infusible. The cations are, therefore, effectively removed from solution.

After the resin has adsorbed the cations it can readily be regenerated, for example by washing with a dilute acid, preferably a mineral acid which forms soluble salts with the adsorbed cations.

In order that those skilled in the art better may understand how the present invention is carried into effect the following illustrative examples are given, all parts being by weight.

Example 1

Thirty parts of a finely divided polymerizate obtained by polymerizing a mixture of 90 parts styrene and 10 parts of divinyl benzene was sulphonated by reacting it with an excess (176 parts) of chlorosulphonic acid for three minutes at the reflux temperature of the mass and then for about 50 hours at room temperature. The product was treated with a large volume of water to destroy the excess of chlorosulphonic acid and any acid chloride that might have formed. After filtering, washing and drying a yield of 70 parts of sulphonated polymerizate was obtained. This yield indicates that an average of 1.77 sulphonic acid groups had been substituted into each aryl nucleus.

The following examples illustrate how the sulphonated polymerizates of my invention may be used for adsorbing cations from liquid media.

Example 2

Five parts of the sulphonated polymerizate of Example 1 were wet with 50 parts of distilled water and then 104.5 parts of a standard sodium hydroxide solution were added with shaking. After standing 15 minutes the solution was filtered and the sodium hydroxide remaining in solution was determined by titrating the filtrate with standard hydrochloric acid. The efficiency was measured by calculating the ratio of sodium ions actually removed to the sodium ions theoretically removable if each of the sulphonic acid groups present in the polymerizate had removed a sodium ion. The efficiency was 76%.

Example 3

Five parts of the sulphonated polymerizate of Example 1 were wet with 50 parts of distilled water and then 100 parts of a standard calcium chloride solution were added with shaking. After standing 15 minutes the solution was filtered and the hydrochloric acid generated by the adsorption of the calcium ion from solution was determined by titration with standard sodium hydroxide solution. The efficiency of the resin calculated according to the method described in Example 2 was 64%.

Example 4

The exhausted resin from Example 2 was regenerated by treating it with approximately ⅓ normal hydrochloric acid. After filtering off the acid and washing well with distilled water the sulphonated polymerizate was retested for its ability to adsorb cations according to the method described in Example 2. The efficiency after one regeneration was 43% and after two regenerations was 51%.

In any of the above examples it was impossible to detect any loss in weight of the sulphonated polymerizate because of the insolubility of the resin in the liquid media. This insolubility is very valuable since it allows hot solutions to be treated, whereby the rate of cation adsorption is increased.

Although in the above examples I have used sulphonated polymerizates prepared from the product obtained by polymerizing a mixture containing 10% of a poly-vinyl aryl compound and 90% of a mono-vinyl aryl compound, it will be understood by those skilled in the art that other proportions may be used in preparing the polymerizate to be sulphonated, e. g., from 5 to 100% of at least one poly-vinyl aryl compound and from 95 to 0% of at least one mono-vinyl aryl compound as has been hereinabove described.

Also, I may include an inert material such as diatomaceous earth (e. g., fuller's earth, including spent fuller's earth from petroleum refining processes), alundum, coke, silica, cinders, porous glass, etc., as a carrier for the polymerizate to increase the effective surface of the latter. This may be done by adding such carriers at any time prior to the complete polymerization of the polymerizate to the infusible, insoluble state followed by complete polymerization. In this way the carrier is surface-coated with the polymerizate. An emulsion or dispersion type of polymerization is admirably suited for coating the carrier materials since it can be carried out by adjusting the concentration and type of dispersing or emulsifying agent so as to eliminate the necessity of grinding the polymerizate before use since the product will be obtained in a finely divided state.

What I claim as new and desire to secure by Letters Patent of the United States is:

1. A water-insoluble sulphonated polymerizate of a poly-vinyl aryl compound.

2. A water-insoluble sulphonated polymerizate of a mixture comprising a polyvinyl aryl compound and a mono-vinyl aryl compound.

3. A water-insoluble sulphonated polymerizate of a mixture comprising a di-vinyl aryl compound and a mono-vinyl aryl compound.

4. A water-insoluble sulphonated polymerizate of a mixture comprising divinyl benzene and a mono-vinyl aryl compound.

5. A water-insoluble sulphonated polymerizate of a mixture comprising divinyl benzene and styrene.

6. A water-insoluble sulphonated polymerizate of a mixture comprising divinyl benzene and vinyl naphthalene.

7. A water-insoluble sulphonated polymerizate of a mixture comprising divinyl benzene and vinyl ethyl benzene.

8. A water-insoluble sulphonated polymerizate of a mass comprising a di-vinyl aryl compound.

9. A water-insoluble sulphonated polymerizate of a mass comprising divinyl benzene.

10. The method of treating liquid media to remove cations therefrom which comprises contacting such media with a water-insoluble sulphonated polymerizate of a polyvinyl aryl compound, said polymerizate having cation exchange properties and being present in quantity sufficient to effect substantially complete removal of cations from said liquid media, and separating said polymerizate from the liquid media.

11. The method of treating liquid media to remove cations therefrom which comprises contacting such media with a water-insoluble sulphonated polymerizate of a mixture comprising a poly-vinyl aryl compound and a mono-vinyl aryl compound, said polymerizate having cation exchange properties and being present in quantity sufficient to effect substantially complete removal of cations from said liquid media, and separating said polymerizate from the liquid media.

12. The method of treating liquid media to remove cations therefrom which comprises contacting such media with a water-insoluble sulphonated polymerizate of a mixture comprising a di-vinyl aryl compound and a mono-vinyl aryl compound, said polymerizate having cation exchange properties and being present in quantity sufficient to effect substantially complete removal of cations from said liquid media, and separating said polymerizate from the liquid media.

13. The method of treating liquid media to remove cations therefrom which comprises contacting such media with a water-insoluble sulphonated polymerizate of a di-vinyl aryl compound, said polymerizate having cation exchange properties and being present in quantity sufficient to effect substantially complete removal of cations from said liquid media, and separating said polymerizate from the liquid media.

14. The method of treating liquid media to remove cations therefrom which comprises contacting such media with a water-insoluble sulphonated polymerizate of divinyl benzene, said polymerizate having cation exchange properties and being present in quantity sufficient to effect substantially complete removal of cations from said liquid media, and separating said polymerizate from the liquid media.

15. The method of treating liquid media to remove cations therefrom which comprises contacting such media with a water-insoluble sulphonated polymerizate of divinyl benzene and styrene, said polymerization having cation exchange properties and being present in quantity sufficient to effect substantially complete removal of cations from said liquid media, and separating said polymerizate from the liquid media.

16. The method of treating aqueous media to remove cations therefrom which comprises percolating such media through a water-insoluble sulphonated polymerizate of divinyl benzene and styrene, said polymerizate having cation exchange properties and being present in quantity sufficient to effect substantially complete removal of cations from the aqueous media.

17. The method of treating liquid media to remove cations therefrom which comprises depositing on an inert carrier a surface coating of a water-insoluble sulphonated polymerizate of divinyl benzene and styrene having cation exchange properties, and contacting a liquid medium containing cations with the treated carrier to remove the cations from the liquid medium, said treated carrier containing a quantity of said polymerizate sufficient to effect substantially complete removal of the cations from said liquid medium, and separating the treated carrier from the liquid medium after treatment of the liquid medium therewith.

GAETANO F. D'ALELIO.